F. SCHLICH,

Assignor of one-half interest to ADRIAN FEYH.

STOPPERS FOR BOTTLES.

No. 7,408. Reissued Nov. 28, 1876.

Witnesses

Chas. H. Smith

Geo. T. Pinckney

Inventor

Frederick Schlich for Lemuel W. Serrell

Atty.

THE GRAPHIC CO. N.Y.

UNITED STATES PATENT OFFICE.

FREDERICK SCHLICH, OF NEW YORK, N. Y., ASSIGNOR OF ONE-HALF INTEREST TO ADRIAN FEYH.

IMPROVEMENT IN STOPPERS FOR BOTTLES.

Specification forming part of Letters Patent No. 49,793, dated September 5, 1865; reissue No. 7,408, dated November 28, 1876; application filed October 5, 1876.

*To all whom it may concern:*

Be it known that I, FREDERICK SCHLICH, of the city and State of New York, have invented, made, and applied to use a certain new and useful Improvement in Stoppers for Bottles; and I do hereby declare the following to be a full, clear, and exact description of my said invention, reference being had to the annexed drawing, making part of this specification, wherein—

Figure 1:
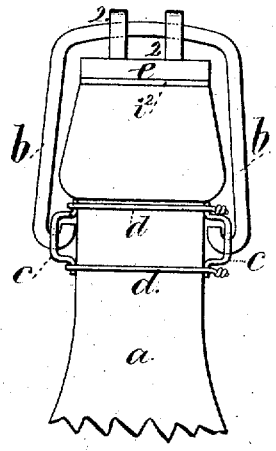
Figure 2:
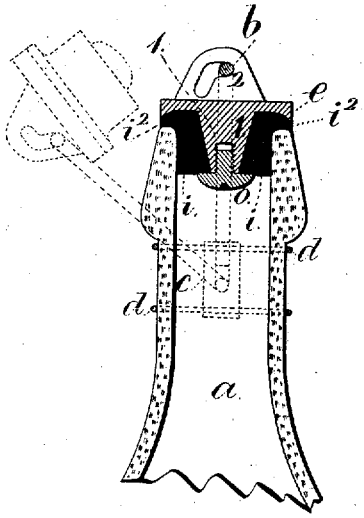
Figure 3:
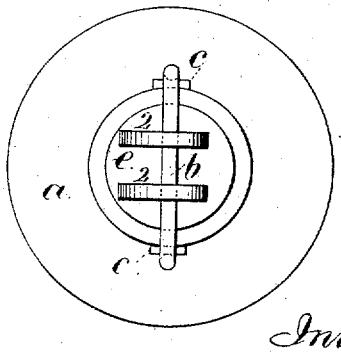

Figure 1 is an elevation of the stopper as in a bottle-neck Fig. 2 is a section of the same, showing also the stopper thrown back by the dotted lines; and Fig. 3 is a plan of the stopper as closed.

The said invention relates to a peculiarly-constructed elastic stopper, the same being held to the neck of the bottle by a swinging bail, and a slotted wing upon the metallic body of the stopper receives the bail, and serves to hold the stopper to the bottle.

In the drawing, *a* represents a portion of the neck of a bottle. *b* is a bail, that is secured at its ends by a neck-band. I have shown the fulcrum-loops *c*, that are clamped to the sides of the bottle-neck by the wires *d*, the ends of these loops *c* setting below the shoulder or head of the bottle. These fulcrum-loops are easily made and attached, and will allow the bail to swing in either direction. *e* is a metallic or other body, formed with a tapering projection, 1, on one side, and with a slotted or cam-shaped ring, 2, on the upper side. I have shown two of these wings on said body; but only one might be employed.

Around the conical projection 1 is a rubber stopper, *i*. The size of this rubber or elastic stopper *i* corresponds with the smaller sizes of bottle-mouths into which it is adapted to set. The mouths of bottles of a given character vary slightly in size; hence I provide the tapering projection 1 and a screw, *o*, so as to adapt my improvement to such variations, for by screwing in the screw *o* the elastic stopper will be enlarged by compression, and by the taper of the projection 1. By this means I am enabled to easily fit the stopper to the size of the mouth, while the elastic flange $i^2$ sets upon the end of the neck, thus furnishing a double security. When the elastic stopper is forced against the neck of the bottle, the tapering portion 1 of the stopper *e* serves to tighten the rubber against the surface of the neck as the rubber is compressed. The bail *b* passes through the slot in the wing 2, and said slot, being curved or L-shaped, forms a cam. When the stopper is forced into the bottle the bail is turned into the horizontal portion of the slot and holds the stopper firmly in place. When the bottle is to be opened the said bail is pushed back into the other or vertical portion of the slot, which relieves said stopper, allowing it to draw out and turn back with the bail, as seen by dotted lines in Fig. 2.

This improvement is especially adapted to bottles for ale, porter, beer, and other liquids that are not filled under pressure, but require to be closed securely. I do not, however, limit my invention to use with any particular character of liquid.

I am aware that a bottle-stopper has been made with a rigid body hinged at one side to the neck-band, and having a movable hasp at one side to connect the body to the neck-band, and in this stopper a cam or lever has been used to bear upon the stopper. These devices are complicated and liable to injury.

In some cases a rigid body has been used with an elastic surface, and the body was an elongated spheroid; hence the rubber was not spread at the upper part against the bottle.

In my stopper all the parts remain connected, the pressure tightens the elastic stopper by the expansion resulting from the conical portion of the body, and the bail swings on the neck-band, and the stopper on the bail, in opening and closing.

I claim as my invention—

1. The combination, in a bottle-stopper, of a body having an opening in the upper part, a bail having pivots at both ends and passing through the opening in the body, and an elastic surface to such body intervening between the body and the bottle, substantially as set forth.

2. A bottle-stopper having a rigid body, composed of a disk and conical projection from the disk, entering within the elastic portion of the stopper, substantially as set forth.

3. The combination, in a bottle-stopper, of a neck-band, a swinging bail, pivoted at its end to the neck-band, a stopper having an elastic surface and rigid body, and a transverse opening through the body for the wire of the bail, whereby the stopper swings upon the bail-wire in opening and closing the bottle, substantially as set forth.

4. The fulcrum-loops *c*, secured by the neck-band wires *d*, in combination with the bail *b* and bottle-stopper, substantially as set forth.

5. The elastic stopper, in combination with the tapering projection 1 and screw *o*, as and for the purposes specified.

6. The swinging bail, in combination with the elastic stopper and wing or wings 2, as and for the purposes specified.

7. The stopper formed of india-rubber, with a flange to take the top of the bottle around a central projection entering the neck, so as to render the stopper tight, as set forth.

Signed by me this 30th day of September, A. D. 1876.

FREDERICK SCHLICH.

Witnesses:

GEO. D. WALKER,
HAROLD SERRELL.